United States Patent [19]
Adams et al.

[11] 3,872,325
[45] Mar. 18, 1975

[54] R-F SWITCHING CIRCUIT

[75] Inventors: Melvin Edward Adams, Pennsauken; Rubin Feryszka, Somerville, both of N.J.

[73] Assignee: RCA Corporation, New York, N.Y.

[22] Filed: Oct. 17, 1973

[21] Appl. No.: 407,183

[52] U.S. Cl. .................................. 307/251, 307/304
[51] Int. Cl. .................................. H03k 17/60
[58] Field of Search .................................. 307/251, 304

[56] References Cited

UNITED STATES PATENTS

| | | | |
|---|---|---|---|
| 3,386,053 | 5/1968 | Priddy | 307/251 X |
| 3,412,266 | 11/1968 | Tarico | 307/251 |
| 3,588,525 | 6/1971 | Hatsukano | 307/251 X |
| 3,678,297 | 7/1972 | Takahashi | 307/251 |
| 3,731,116 | 5/1973 | Hill | 307/251 |

*Primary Examiner*—John S. Heyman
*Attorney, Agent, or Firm*—H. Christoffersen; S. Cohen; A. L. Limberg

[57] ABSTRACT

An insulated gate field effect transistor (IGFET) is used selectively to connect a source of radio frequency (e.g., VHF) signal to means for utilizing the radio frequency signal. First and second gate potentials are selectably applied to the IGFET to render its channel conductive and non-conductive, respectively. The first potential is applied from a source impedance appreciably higher than the reactance of the gate-to-channel capacitance of the IGFET for radio frequency signal. This prevents a distributed RC transmission line effect in the IGFET introducing reflections back to the source of radio frequency signals when the IGFET channel is conductive. The second potential is applied from a source impedance appreciably lower than the reactance of the gate-to-source and gate-to-drain capacitances of the IGFET for radio frequency signal, to reduce feedthrough of radio frequency signal when the channel is non-conductive.

10 Claims, 5 Drawing Figures

R-F SWITCHING CIRCUIT

The invention herein described was made in the course of or under a contract or subcontract thereunder, with the Department of the Army.

The present invention is directed to radio frequency signal switching, particularly in the VHF band, using insulated-gate field-effect transistors (IGFET's).

Very-high-frequency (VHF) radio receivers can now be made sufficiently compact and light-in-weight for a man to carry conveniently and comfortably. These receivers are designed to receive a range of frequencies in the VHF band which exceeds an octave. Varactor-tuned radio-frequency circuitry cannot be tuned over so wide a frequency range with presently available varactors, particularly since close tracking with a varactor-tuned local oscillator is required in the normal heterodyne type of radio receiver. To solve this problem, it is desirable to employ at the input stage of the receiver, a plurality of varactor-tuned radio-frequency amplifiers, each tuned to a different band, and to select one such amplifier for the initial amplification of the radio-frequency signal prior to heterodyning or mixing it with the local oscillator signal.

In the prior art, the selection above is made either by PIN diode switches or by mechanical relays. PIN diodes demand control power which is excessive for a battery powered miniature radio receiver. Since they are two terminal devices, PIN diodes require relatively complex circuitry to control their operation. PIN diode fabrication is not readily compatible with the fabrication of integrated circuit radio-frequency amplifier devices, and this means that the amplifier and band-switching circuitry are not easily included within a single integrated circuit. Relays for radio-frequency r-f signals are relatively unreliable and expensive.

The use of IGFET's in electronic switching is described in U.S. Pat. No. 3,327,133, issued June 20, 1967, to Louis Sickles II, entitled "Electronic Switching" and assigned to RCA Corporation. Of particular interest is a configuration called a "transmission gate" in which a signal source is selectably connected to utilization means via the adjustably conductive path afforded by the IGFET channel. IGFET's are readily and economically fabricated in arrays, the most familiar process for so doing being the metal-oxide-semiconductor (MOS) process. This type of processing is now sufficiently well understood that reliable IGFET's can be made using it. Since IGFET's are voltage-controlled rather than current controlled switching devices, virtually no power is required from their control circuitry. Since IGFET's are commonly used in radio-frequency amplifiers, the r-f amplifiers and the IGFET's for bandswitching purposes can be included within the same integrated circuit.

The use of a transmission gate for switching rf signals presents certain problems. One problem is to avoid reflections when the transmission gate is transmissive. Another problem is to avoid feedthrough of rf signal when the transmission gate should be non-transmissive.

These problems are each solved in the embodiments of the present invention by applying control potentials at prescribed impedance levels to the gate electrodes of the IGFET used in the transmission gate. A control potential level to bias the channel into conduction is provided at a relatively high impedance level, and a control potential level to bias the channel out of conduction is provided at a relatively low impedance level.

Figure 1:
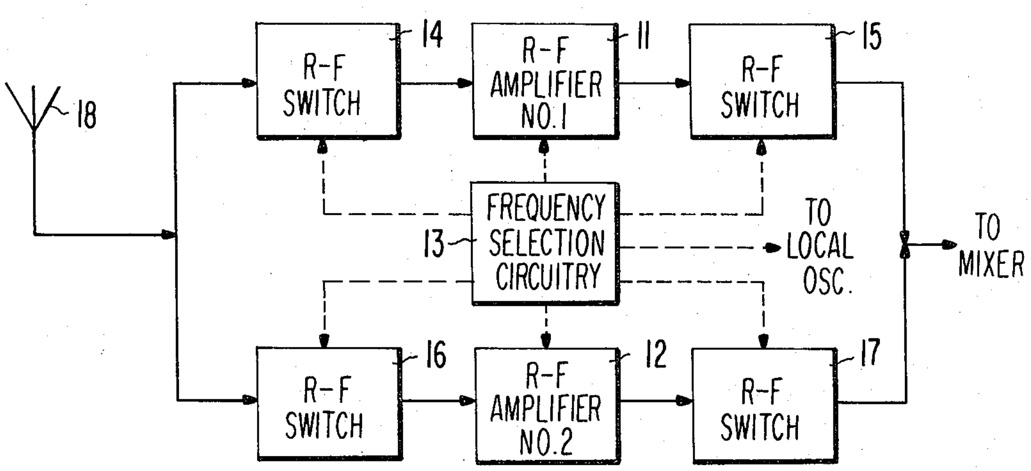
FIG. 1 shows a band-switching arrangement wherein rf switches embodying the present invention are useful.

FIG. 1 shows a band-switching arrangement which permits selection between two r-f amplifiers 11 and 12, although similar arrangements permitting selection amongst a multiplicity of greater than 2 of rf amplifiers are also possible. Frequency selection circuitry 13 controls the varactor tuning of the r-f amplifiers 11 and 12, as well as the varactor tuning of the local oscillator (not shown) of the radio receiver, assuming it to be heretodyne type.

Frequency selection circuitry 13 also controls the band-switching between one of two alternative conditions, as follows. In one condition, the frequency selection circuitry 13 causes r-f switches 14 and 15 to close and r-f switches 16 and 17 to open. Closed switch 14 connects the antenna 18 to the input circuit of r-f amplifier 11, and closed switch 15 connects the output circuit of r-f amplifier 11 to the mixer (not shown) of the radio receiver, supposing it to be a heterodyne type. The band of frequencies amplified by r-f amplifier 11 is thus selected. R-f amplifier 12 is disconnected from the circuitry actively receiving signal and may additionally be deprived of its supply of operating power.

In the other condition, the frequency selection circuitry 13 causes r-f switches 14 and 15 to open and r-f switches 16 and 17 to close. R-f amplifier 12 will then be connected into the circuitry actively receiving signal, and r-f amplifier 11 will be disconnected therefrom.

Figure 2:
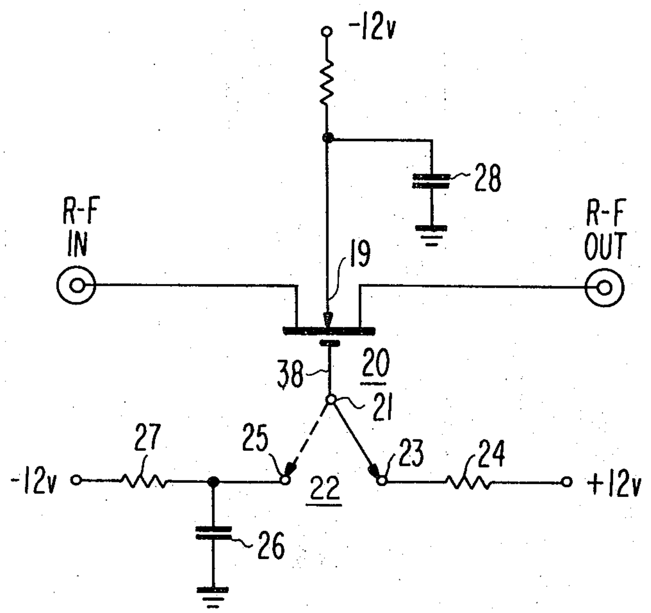
FIG. 2 is a schematic diagram illustrating an IGFET arranged to switch an r-f signal in accordance with the present invention.

FIG. 2 illustrates the fundamental inventive concept which has been found to permit the successful use of an IGFET 20 as an r-f switch to connect selectably the terminal R-F OUT to the terminal R-F IN. The substrate 19 of the IGFET 20 (shown as being an *n*-channel type) is biased per convention to isolate it from other IGFET's that may share the same substrate. The channel of IGFET 20 is connected between its drain and source electrodes, which are interchangeably defined and are connected respectively to separate ones of the terminals R-F IN and R-F OUT. The average value of the r-f signal applied to the terminal R-F IN is assumed to be at ground reference potential.

The gate electrode 38 of IGFET 20 is connected to a terminal 21 of a single-pole double-throw switch 22. In one position of switch 22 (shown in solid line), the gate electrode of IGFET 20 is connected to terminal 23, which is connected via a resistive element 24 to a potential (+12 volts, as shown). This potential is of an amplitude and polarity with respect to an r-f signal applied to the R-F IN terminal to cause the channel of IGFET 20 to be conductive and therefore to couple the terminal R-F OUT to the terminal R-F IN.

Figure 3:
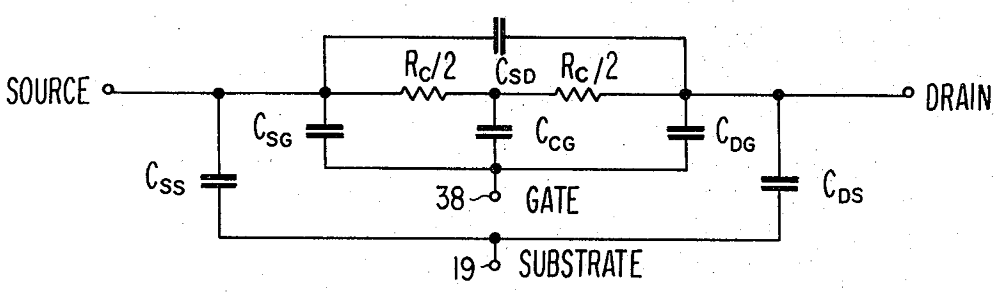
FIGS. 3 and 4 are schematic diagrams of equivalent circuits of the IGFET shown in FIG. 2 for the conditions where its channel is conductive and non-conductive, respectively.

FIG. 3 shows an equivalent circuit of IGFET 20 when its channel is in a fully conductive state, which equivalent circuit is valid for use in the VHF band. In FIG. 3:

$C_{SS}$ is the source junction to substrate capacitance of IGFET 20, $C_{SG}$ is the source to gate capacitance of IGFET 20, $C_{SD}$ is the source to drain capacitance of IGFET 20, $C_{CG}$ is the channel to gate capacitance of IGFET 20, $C_{DG}$ is the drain to gate capacitance of IGFET 20, $C_{DS}$ is the drain junction to substrate capacitance of IGFET 20, and RC is the channel resistance of IGFET 20 when the channel is fully conductive.

The channel resistance is shown as comprising two lumped resistors each having a resistance equal to one-half RC.

Typical values of elements in the equivalent circuit of an IGFET used to realize the present invention are as follows:

$$C_{SS} = C_{DS} = 7.5 \text{ pf},$$

$$C_{SD} = 0.3 \text{ pf},$$

$$C_{SG} = C_{DG} = 1 \text{ pf},$$

$$C_{CG} = 12.5 \text{ pf, and}$$

$$R_C = 4 \text{ ohm}.$$

Figure 4:
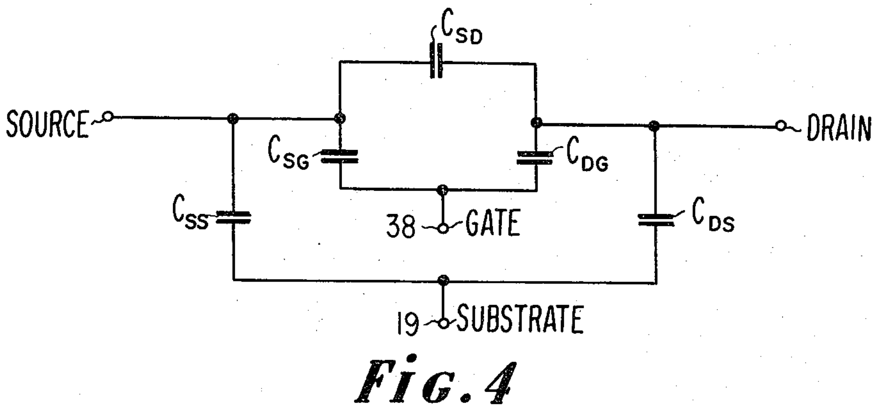

It is assumed in the equivalent circuits of both FIGS. 3 and 4 that the capacitances are not lossy, which is a valid assumption for an MOS IGFET built on an epitaxial layer over a very low resistance (<1 ohm-centimeter) substrate. The assumption that $R_C$ and $C_{CG}$ are lumped values is an acceptable one as regards signal in the VHF band.

Referring back to the circuit of FIG. 2, where the switch 22 is in a position to couple the gate electrode of IGFET 20 via resistive element 24 to a potential which renders the channel of IGFET 20 conductive, the low value of $R_C$ couples the terminal R-F OUT to the terminal R-F IN. There is little attenuation due to the presence of $R_C$ alone between these terminals, assuming the connections to them to have the normal 50 or 75 ohm characteristic impedance. However, the present inventors have recognized that the capacitances $C_{SG}$, $C_{CG}$ and $C_{DG}$ of FIG. 3 form a distributed RC transmission line with $R_C$. They have found that if the gate electrode of IGFET 20 is connected by low a-c impedance to ground, this distributed line causes a reflection into the transmission line supplying signal to the R-F IN terminal. At 80 MHz, this undesirable effect causes a VSWR of approximately 3dB. This effect is avoided in the present invention by employing for resistive element 24, a resistance of much higher value than the combined reactance of capacitances $C_{SG}$, $C_{CG}$ and $C_{DG}$ for frequencies of interest. In a typical circuit, the resistance of element 24 may be 100 kilohms, for example. With a value of resistance this high, the distributed shunt capacitance afforded by $C_{SG}$, $C_{CG}$ and $C_{DG}$ floats rather than being connected to ground, and the gate electrode 38 of IGFET 20 is permitted to follow the r-f signal. Therefore, the capacitances $C_{SG}$, $C_{CG}$ and $C_{DG}$ do not introduce reflections on transmission lines connected to the terminals R-F IN and R-F OUT.

When switch 22 is in the alternative position (shown in dashed line), the gate electrode of IGFET 20 is connected to terminal 25. Terminal 25 is connected via resistive element 27 to a potential (−12 volts, as shown) of an amplitude and polarity with respect to an r-f signal applied to the R-F IN terminal to cause the channel of IGFET 20 to be non-conductive. Terminal 25 is also by-passed to ground by a capacitor 26, which bypassing causes a very low a-c impedance to be seen by the gate electrode of IGFET 20 when its channel is biased into non-conduction.

FIG. 4 shows an equivalent circuit of the IGFET 20 when its channel is in a non-conductive state, which equivalent circuit is valid for use in the VHF band. The very low a-c impedance connected to the gate electrode by capacitor 26 effectively eliminates the r-f feedthrough path between source and drain electrodes which would otherwise be provided by a series connection of $C_{SG}$ and $C_{DG}$. Furthermore, with the gate electrode of IGFET 20 by-passed to ground, $C_{SG}$ and $C_{DG}$ together with $C_{SD}$ form a pi-section attenuator network. This network also aids in reducing the r-f feedthrough from R-F IN to R-F OUT via the source-drain capacitance $C_{SD}$.

The substrate of IGFET 20 can be completely by-passed to ground by capacitor 28 in the FIG. 2 configuration, which eliminates r-f feedthrough via the substrate, that is, through $C_{SS}$ and $C_{DS}$. However, the capacitance of by-pass capacitor 28 preferably should not be this large but rather should be only large enough to reduce r-f feedthrough through $C_{SS}$ and $C_{DS}$ to a value negligible compared to the r-f feedthrough through $C_{SD}$. Then, the capacitance of capacitor 28 will limit the r-f current flowing from channel to substrate of IGFET 20 when the r-f input signal is excessively large and tends, on peaks, to forward-bias the channel-to-substrate junction.

In the operation of the circuit of FIG. 2, with the channel of IGFET 20 biased into non-conduction, as described, rf isolations of 65 and 47 dB, respectively, between R-F IN and R-F OUT terminals have been attained at 10 and 80 MHz, respectively. This was accomplished with the circuit of FIG. 2 inserted in a 50 ohm transmission line, using a 100 kilohm resistive element 27 and a 0.001 microfarad by-pass capacitor 26. Intermodulation products introduced into the r-f signal by the switch were at least 110 dB below r-f signal level in the circuit. Noise figure degradation for the same circuit with a +32 dBm r-f signal applied to its R-F IN terminal was 0.5 dB. This degradation was caused by straight-forward insertion loss; gate noise modulation was negligibly small.

Figure 5:
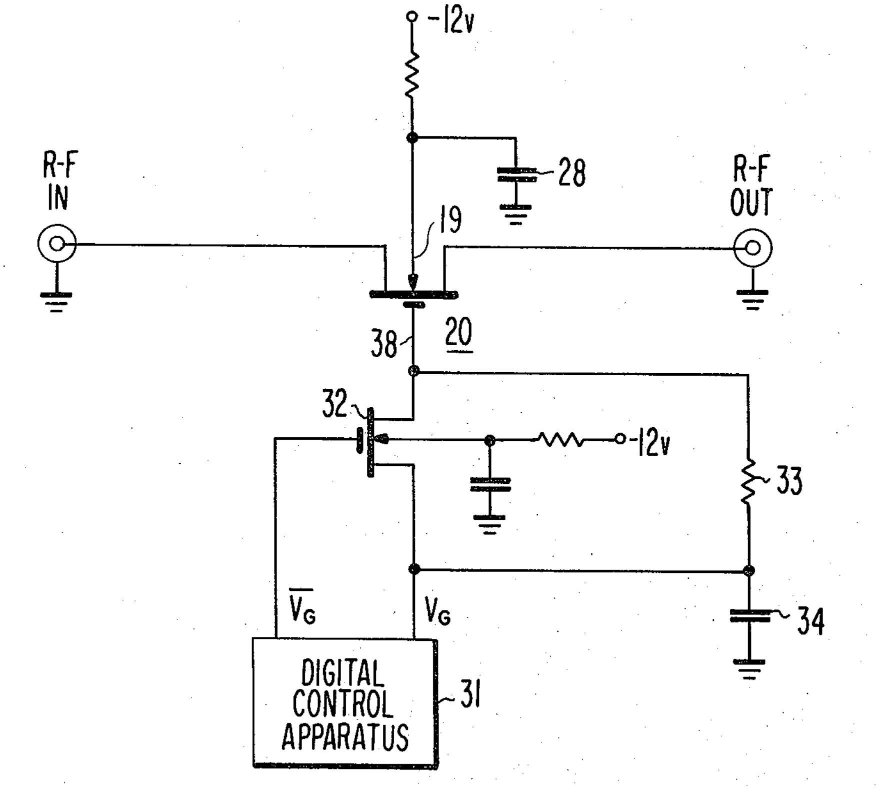
FIG. 5 is a block and schematic diagram of a preferred embodiment of the present invention.

FIG. 5 shows how the simple switch 22 and associated elements 23–27 of FIG. 2 may be replaced by more sophisticated electronic control circuitry in an actual radio receiver. The radio receiver uses digital control apparatus 31 providing complementary-logic output potentials $V_G$ and $\bar{V}_G$. When the IGFET channel is to be non-conductive, the control apparatus 31 causes $V_G$ to be "LOW" (e.g., −12 volts) and $\bar{V}_G$ to be "HIGH" (e.g., +12 volts). These values of $V_G$ and $\bar{V}_G$ bias the channel of IGFET 32 into conduction, providing a low-impedance connection between the gate electrode 38 of IGFET 20 and by-pass capacitor 34. This provides the gate electrode of IGFET 20 with the desired low source impedance. At the same time, the (negative) potential $V_G$ for biasing the channel of IGFET 20 into non-conduction is applied via the conduction channel of IGFET 32 to the gate electrode 38.

When the IGFET 20 channel is to be conductive, the control apparatus 31 causes $V_G$ to be "HIGH" (e.g., +12 volts). These values of $V_G$ and $\bar{V}_G$ bias IGFET 32 so its channel is non-conductive. The gate electrode of IGFET 20 is coupled to the positive $V_G$ potential primarily through the resistive element 33. The resistance of element 33 is made high enough (such as 100 kilohms) to essentially "float" the gate electrode 38 relative to ground and thereby prevent RC transmission line in IGFET 20 from introducing reflections into the r-f signal coupled to the terminal R-F IN.

This switching arrangement just described also is advantageous in that the drain-to-source potential of IGFET 32 is kept low. When IGFET's 20 and 32 are constructed by similar techniques within an MOS integrated circuit, the constraints upon their maximum drain-to-source potentials tend to be more severe than the constraints upon any of their other inter-electrode potentials. In such a construction, IGFET 32 will normally be constructed with a simpler and smaller geometry than IGFET 20 since the impedance of the channel of IGFET 32, when fully conductive, need not be so low as that of the channel of the r-f switch IGFET 20. In such an integrated circuit, array resistors may be realized using self-biased IGFET's, as is well known.

A simple variation of the FIG. 5 circuit, wherein IGFET 32 is provided fixed gate electrode bias potential at a value intermediate the positive and negative values of $V_G$, is possible. This variation eliminates the need for complementary logic control signals.

Other circuits for carrying out the present invention will readily suggest themselves to the skilled circuit designer. For example, a positive potential might be continuously coupled to the gate electrode of IGFET 20 by means of a resistive element with suitably high resistance, and a transistor then employed to selectably clamp the gate electrode of IGFET 20 to a low impedance source of negative potential. With appropriate change in the biasing potentials p-channel IGFETS may be used rather than the n-channel IGFETS shown. R-f switches using parallelled p-channel and n-channel IGFETS simultaneously switched into or out of conduction are possible. Such alternative configurations are to be considered within the scope of the broader claims of this application.

What is claimed is:

1. In an electronic switching system comprising a source of at least one radio-frequency signal, utilization means for at least a portion of said radio-frequency signal, an insulated-gate field effect transistor with source and drain electrodes and a transmission channel of variable conductivity therebetween and with a gate electrode for controlling the conductivity of its transmission channel, said field-effect transistor having a source-to-drain capacitance and having a gate-to-channel capacitance including gate-to-source capacitance and gate-to-drain capacitance components thereof, means for selectably coupling said source of radio-frequency signal and said utilization means in loop including said transmission channel, means for selectably applying a first or a second potential level to said gate electrode, said first potential level being of a polarity with respect to said radio-frequency signal as applied with respect to said transmission channel to render said transmission channel relatively conductive when applied to said gate electrode, said second potential level being of a polarity with respect to said radio-frequency signal as applied to said transmission channel to render said transmission channel relatively non-conductive when applied to said gate electrode, the improvement wherein said means for selectably applying a first or a second potential level applies said first potential level to said gate electrode at an impedance level higher for said radio-frequency signal than that presented by its gate-to-channel capacitance and applies said second potential level to said gate electrode at an impedance level lower for said radio-frequency signal than that presented by each of its said gate-to-source and gate-to-drain capacitances.

2. The improvement set forth in claim 1 wherein said means for selectably applying a first and a second potential comprises:

an auxiliary transistor of the same conductivity type as said insulated-gate field-effect transistor, said auxiliary transistor having a principal conduction path between first and second electrodes and having a control electrode, the conductance of said principal conduction path being responsive to potential applied between said control and first electrodes, said second electrode being connected to said gate electrode;

a resistive element having a resistance higher than the impedance of said gate-to-channel capacitance for said radio-frequency signal, said resistive element being connected between said first and said second electrodes of said auxiliary transistor;

means for selectably applying said first and said second potential to said first electrode of said auxiliary transistor at an impedance level for said radio-frequency signal lower than that of each of said gate-to-source and gate-to-drain capacitances; and means for applying a potential to said control electrode of said auxiliary transistor such that it is rendered relatively non-conductive when said first potential level is applied to its first electrode and relatively conductive when said second potential level is applied to its first electrode.

3. The improvement set forth in claim 2 wherein:

said auxiliary transistor is of an insulated-gate field effect type and is formed together with said insulated gate field-effect transistor in an MOS integrated circuit, and a digital control apparatus provides first and second complementary logic output signals each switchable between said first and second potential levels, said first and said second output signals thereof being applied respectively to the first electrode and to the control electrode of said auxiliary transistor.

4. The improvement claimed in claim 3 wherein:

a by-pass capacitor couples the first electrode of said auxiliary transistor to a radio-frequency signal ground.

5. Switching apparatus for selectably connecting an input terminal for an r-f signal to an output terminal, comprising, in combination:

a field-effect transistor having a conduction path connected at one end to said input terminal and at its other end to said output terminal and having also a control electrode for controlling the impedance of said path;

relatively high r-f impedance circuit means;

relatively low r-f impedance circuit means;

means for concurrently applying a control signal to said control electrode of a sense to place said conduction path in a relatively low r-f impedance condition while connecting said relatively high r-f impedance means between said control electrode and r-f ground; and means for concurrently applying a control signal to said control electrode of a sense to place said conduction path in a relatively high r-f impedance condition while connecting said relatively low r-f impedance means between said control electrode and r-f ground.

6. Switching apparatus for selectably connecting an input terminal for an r-f signal to an output terminal comprising, in combination:

a field-effect transistor having a conduction path connected at one end to said input terminal and at its other end to said output terminal and having also a control electrode for controlling the impedance of said path;

means for applying control signals to said control electrode for switching said conduction path between relatively high and relatively low impedance conditions; and means for connecting said control electrode to r-f ground via a relatively low r-f impedance path when said conduction path is in its relatively high impedance condition and via a relatively high r-f impedance path when said conduction path is in its relatively low impedance condition.

7. Swtiching apparatus for selectably connecting an input terminal for an r-f signal to an output terminal comprising, in combination:

a field-effect transistor having a channel connected between said input and said output terminals and having a gate electrode for controlling the conduction of said channel, and a source for controllably and alternatively applying a first control potential to said gate electrode of a sense to make said channel conductive or applying a second control potential to said gate electrode of a sense to make said channel non-conductive, said source characterized by offering a high impedance to r-f signal when applying said first potential and a low impedance to r-f signal when applying said second potential.

8. Swtiching apparatus for selectably connecting an input terminal for r-f signal to an output terminal comprising, in combination:

a field-effect transistor having a channel connected between said input and said output terminals and having a gate electrode for controlling the conduction of said channel, a source for applying a first control potential to said gate electrode, of a sense to make said channel conductive and at relatively high r-f impedance; and a source for controllably applying a second control potential to said gate electrode, of a sense to make said channel non-conductive and at relatively low r-f impedance.

9. A radio-frequency signal selector system comprising:

means for supplying radio-frequency signals of which one is to be selected;

a plurality of radio-frequency amplifiers tuned to different portions of the frequency spectrum from each other, each having an input circuit and an output circuit;

a plurality of insulated-gate field-effect transistors, each having source and drain electrodes and a transmission channel therebetween, each having its transmission channel connecting said means for supplying radio-frequency signals to a respective input circuit of one of said radio-frequency amplifiers, each having a gate electrode for controlling the conductivity of its transmission channel, each having a source-to-drain capacitance, each having a gate-to-channel capacitance including gate-to-source capacitance and gate-to-drain capacitance components thereof; and frequency selection circuitry means for selectably applying a first potential level to the gate electrode of a selected one of said plurality of field-effect transistors, from an impedance higher at said radio-frequencies than the gate-to-channel capacitance of said selected field-effect transistor, and applying a second potential level to the gate electrode of each non-selected one of said plurality of field-effect transistors, from an impedance lower at said radio frequencies than that presented by its respective said gate-to-source and gate-to-drain capacitances, the polarity and value of said first potential level chosen with respect to the potential exhibited by said supplied radio-frequency signals to render the transmission channel of said selected field-effect transistor relatively conductive and the polarity of and value of said second potential level chosen with respect to the potential exhibited by said supplied radio-frequency signals to render the transmission channels of said non-selected field-effect transistors relatively non-conductive.

10. A radio-frequency signal selector system comprising:

means for supplying radio-frequency signals of which one is to be selected;

means for utilizing said selected radio-frequency signal;

a plurality N in number, of radio-frequency amplifiers tuned to different portions of the frequency spectrum from each other, each having an input circuit and an output circuit;

first and second pluralities, N in number, of insulated-gate field-effect transistors, each of said transistors having source and drain electrodes and a transmission channel therebetween, each of said transistors having a gate electrode for controlling the conductivity of its transmission channel, each of said transistors having a source-to-drain capacitance and having a gate-to-channel capacitance including gate-to-source capacitance and gate-to-drain capacitance components thereof, each of the transistors in said first plurality having its transmission channel connecting said means for supplying radio-frequency signals to respective input circuit of one of said radio-frequency amplifiers, and each of the field-effect transistors in said second plurality having its transmission channel connecting a respective output circuit of one of said radio-frequency amplifiers to said means for utilizing said selected radio-frequency signal; and frequency selection circuitry means for selectably applying gate potentials to a selected pair of field-effect transistors to render their transmission channels relatively conductive, said selected pair being those with their transmission channels respectively connected to the input circuit and to the output circuit of the one of said radio-frequency amplifiers tuned to the portion of the frequency spectrum being selected, those gate potentials being supplied at impedances higher at said radio-frequencies than the respective gate-to-channel capacitances of said selected field-effect transistors, and for applying gate potentials to the rest of said field-effect transistors to render their transmission channels relatively non-conductive, from impedances lower at said radio-frequencies than that of its respective said gate-to-source and gate-to-drain capacitances.

* * * * *